Nov. 5, 1957  R. W. BECKENHAUER  2,811,806
CROWN DUSTER FOR LOW GROWING, LEAFY PLANTS
Filed Dec. 19, 1955  2 Sheets-Sheet 1
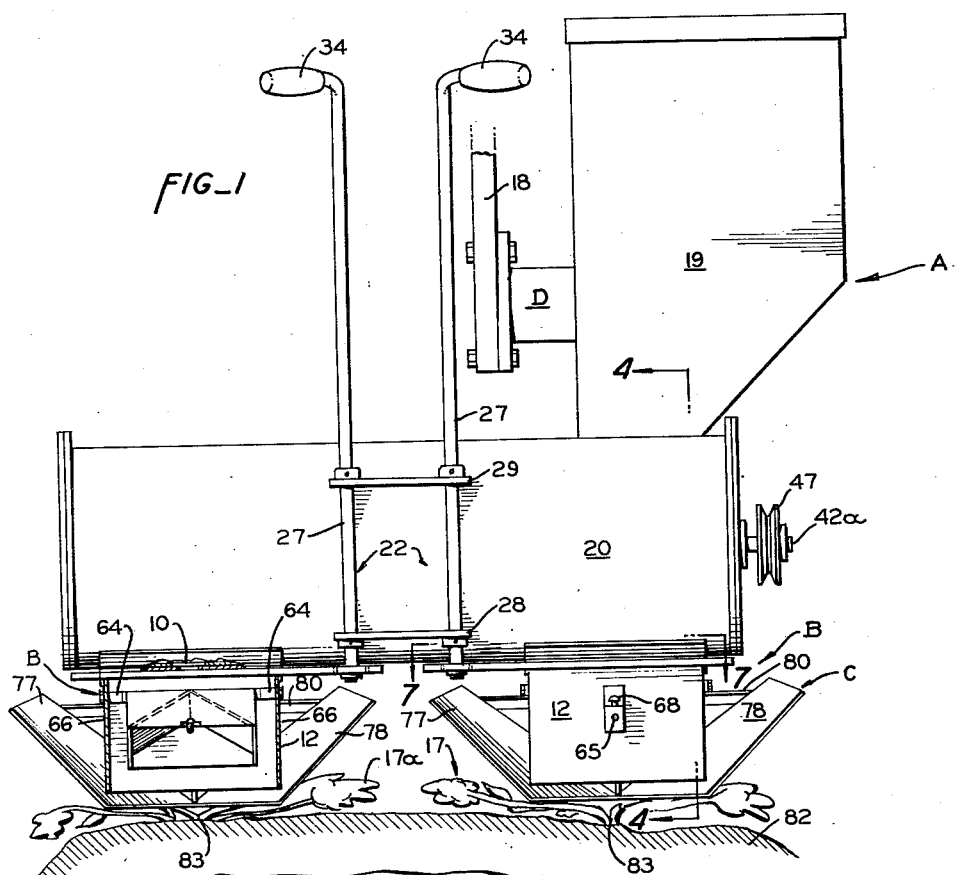
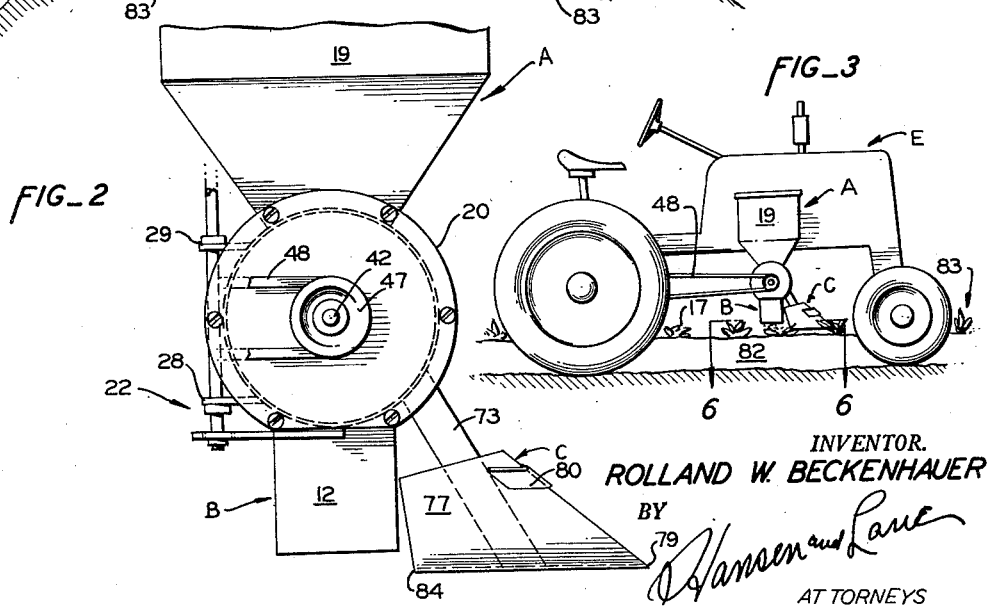
INVENTOR.
ROLLAND W. BECKENHAUER
BY
ATTORNEYS Nov. 5, 1957 R. W. BECKENHAUER 2,811,806
CROWN DUSTER FOR LOW GROWING, LEAFY PLANTS
Filed Dec. 19, 1955 2 Sheets-Sheet 2
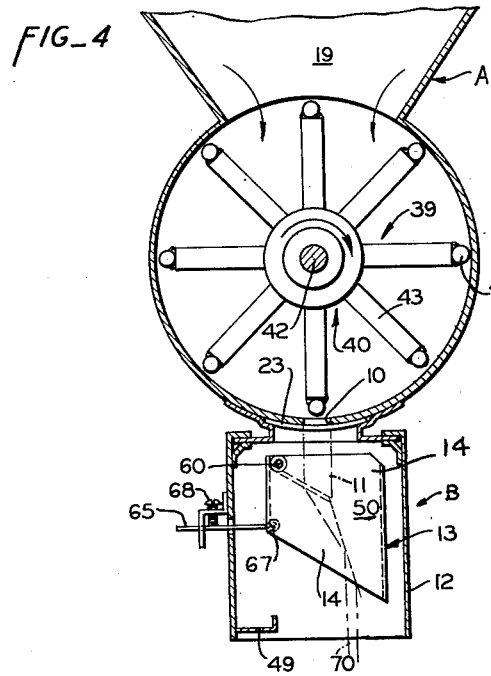
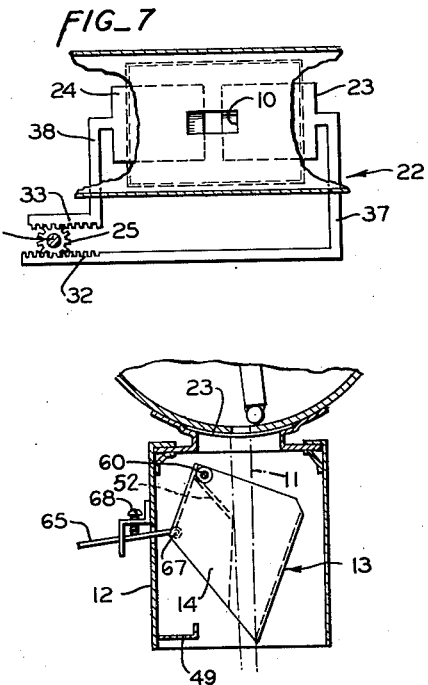
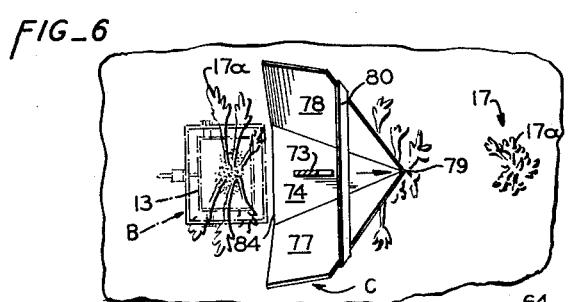
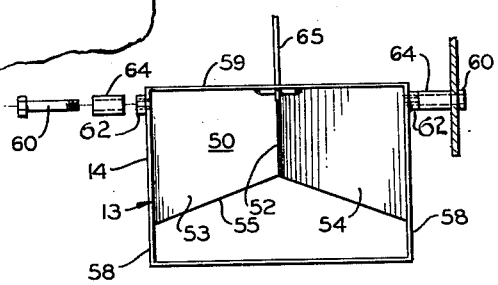
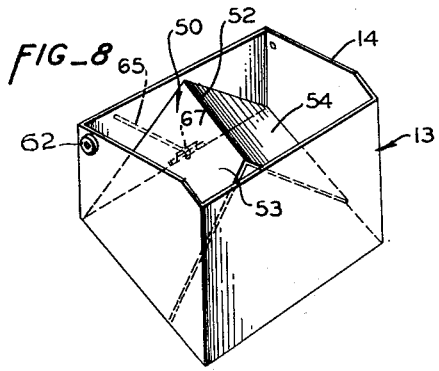
INVENTOR.
ROLLAND W. BECKENHAUER
BY
ATTORNEYS

2,811,806
CROWN DUSTER FOR LOW GROWING, LEAFY PLANTS

Rolland W. Beckenhauer, Freedom, Calif.

Application December 19, 1955, Serial No. 553,801

7 Claims. (Cl. 43—145)

The present invention relates to an insecticide applicator, and pertains more particularly to a mechanism for applying insecticidal dust to low-growing plants, such as strawberries.

Strawberry plants bear for several years after they are planted, and it is necessary to treat them frequently with insecticide throughout their life in order to destroy insect pests which otherwise would prevent them from bearing satisfactorily, particularly during the later period of their life.

Strawberries grow in the form of low-spreading, leafy plants, and the leaves arrange themselves in an umbrella-like canopy over the crown of the plant. Thus, it is difficult to reach the crown, where many destructive insects are found, with ordinary dusting or spraying mechanisms.

It has been the practice in the past, when dusting strawberry plants, either to use an excess amount of insecticidal dust, applying the dust directly on the plants, or to attempt to blow the dust laterally beneath the sheltering leaves in an attempt to reach the vital crown portion of the plant.

The present invention contemplates the provision of a dusting mechanism for use on low growing plants which will spread the leaves of the plants apart to expose their crowns, and will cause a controlled stream of insecticidal powder of a desired width to gravitate onto the thus exposed crowns of the plants.

Another object is to provide an improved insecticidal dust applicator for use on low growing plants, such as strawberries.

These and other objects and advantages of the invention will be apparent from the following description and the accompanying drawings, wherein Fig. 1 is a rear elevational view of an insecticidal dust applicator embodying the present invention, portions thereof being broken away.

Fig. 2 is a side elevational view of the lower portion of the mechanism shown in Fig. 1, portions thereof being broken away.

Fig. 3 is a side elevational view in reduced scale of a tractor having a dust applicator of the type illustrated in Figs. 1 and 2 mounted thereon.

Fig. 4 is a fragmentary sectional view on the same scale as Figs. 1 and 2 taken along line 4—4 of Fig. 1.

Fig. 5 is a fragmentary view similar to the lower portion of Fig. 4 but showing the dust deflector tilted forwardly for varying the dust-deflecting characteristics thereof.

Fig. 6 is an enlarged fragmentary horizontal sectional view taken along line 6—6 of Fig. 3.

Fig. 7 is an enlarged fragmentary sectional view taken along line 7—7 of Fig. 1.

Fig. 8 is an enlarged perspective view of the tiltably adjustable dust deflector.

Fig. 9 is a plan view of the dust deflector shown in Fig. 8, a fragment of the distributor housing wall being shown, and a trunnion bolt being shown removed axially from the deflector.

The illustrated embodiment of the invention comprises a dust hopper A having a pair of similar dust distributors B mounted therebeneath. Each distributor B is centered beneath a dust discharge opening 10 in the lower side of the hopper A from which a stream 11 of dust of controlled volume is discharged through a tiltably adjustable dust deflector 13. Each dust deflector 13 is mounted for tiltable adjustment in a rectangular tubular distributor housing 14. Since the parts of the two dust distributors B are alike, the same reference numerals will be used to designate their respective parts.

A plant leaf spreader C is mounted directly ahead of, and below, the lower end of each distributor B. The leaf spreaders C spread apart the leaves 17a (Figs. 1, 3 and 6) on opposite sides of the plants 17 to expose the crown of each plant to the dust gravitating through the discharge openings 10 onto the deflectors 13 and thence through the distributor housings 12.

A mounting bracket D is provided for mounting the dust hopper A and its connected parts on a side frame member 18 (Fig. 1) of a tractor E (Fig. 3) upon which the device is to be mounted. The dust hopper A comprises a rectangular, tapered, box-like upper portion 19 which opens into a cylindrical, lower, hopper portion 20 mounted with its axis extending transversely of the length of the tractor.

Discharge of dust from the lower hopper portion 20 through each discharge opening 10 is controlled by suitable feed control mechanism 22. As illustrated, this dust feed control mechanism comprises a pair of closure slides 23 and 24 which are slidably mounted beneath each discharge opening 10, and are centered in their closed condition in the opening 10 and over the dust deflector 13 therebeneath. Simultaneous and opposite movement of each pair of slides 23 and 24 is accomplished by a pinion 25 secured co-axially to the lower end of a control shaft 27 journaled in a pair of bearing brackets 28 and 29 secured to the lower hopper portion 20.

A pair of toothed racks 32 and 33 (Figs. 1 and 7) are mounted for guided, longitudinal, slidable movement on opposite sides of each pinion 25 for simultaneous and equal movement in opposite directions upon rotative movement of the pinion by a handle lever 34 secured to each shaft 27 within reach of an operator (not shown) of the tractor E. The racks 32 and 33 are connected by arms 37 and 38 to the respective slides 23 and 24, so that the portion of each hopper opening 10 exposed by separating the slides will remain centered in the hopper opening 10 and over the dust deflector 13 regardless of the amount of separation of the slides.

A conventional type of dust agitating rotor 39 (Fig. 4) is provided in the lower hopper portion 20, and consists of a pair of similar end spiders 40 mounted one on each end of a central shaft 42 journaled axially of the cylindrical lower housing portion 20. The ends of corresponding arms 43 of the spiders 40 are connected by wiper rods 44.

A rotor drive pulley 47 is secured to a projecting end portion 42a of the shaft 42, and is driven by a V-belt 48 which in turn has conventional driven connection with an engine driven element (not shown) of the tractor E. Rotation of the shaft 42 by the belt 48 causes rotation of the rotor 39 which swings the rods 44 close to the wall of the cylindrical hopper portion 20 to agitate the dust therein, and to assist in wiping the dust through the discharge openings 10.

Each dust distributor B comprises a tubular, box-like housing 12 of rectangular cross sectional configuration connected in dust tight relation to the under side of the hopper portion 20 centrally beneath each of the dust discharge openings 10 therein. The lower end of each distributor housing 12 is open except for a reinforcing shelf 49 which is mounted across the rear end thereof out of the path of the falling dust.

Tiltably mounted within each distributor housing 12 is the dust deflector 13, which comprises a rectangular, upright, tubular portion 14 with an inverted, V-shaped deflector baffle 50 mounted transversely thereacross. The baffle 50 is mounted with its ridge 52 directed fore-and-aft in the direction of vehicle travel, and the ridge 52 is inclined forwardly and downwardly relative to the central axis of the tubular portion 14.

This forward and downward tilting of the ridge 52 also causes the laterally diverging flat side portions 53 and 54 of the baffle to incline downwardly and forwardly relative to the central axis of the tubular portion 14. The forward edge 55 of the deflector baffle 50 slopes rearwardly relative to the front wall 57 of the tubular portion 14, from which it is spaced rearwardly to permit a free flow of dust downwardly therebetween. The baffle 50 is sealed to the side walls 58 and rear wall 59 of the tiltable tubular portion 14.

Each tiltable deflector 13 is trunnioned on a pair of screws 60 journaled in openings provided therefor in the side walls 58 of the distributor housing 12, and screwed into threaded bosses 62 on opposite sides of the tubular portion 14. The tubular deflector portion 14 is spaced from the side walls 66 of the distributor housing 12 by tubular spacing members 64 (Fig. 1) fitted onto the trunnion screws 60.

A deflector rod 65 for tiltably adjusting the deflector 13 is pivotally connected to the lower rear edge 67 of the tubular portion 14 and is secured in longitudinally adjusted position to the distributor housing 12 by a set screw 68 mounted in a bracket 69 secured to the rear wall of the housing 12.

Tiltably adjusting each deflector 13 on its trunnions 60 varies the width of the dust pattern discharged from the lower end of the distributor B. For example, when the adjusting rod 65 is adjusted to its forward position as shown in Fig. 4, the stream 11 of powder from the slotted opening 10 in the bottom of the hopper chamber 20 will fall onto the laterally and forwardly sloping sides of the baffle 50, and will be deflected thereby laterally toward both sides and cascade off the forward edge 55 of the baffle, thereby broadening the dust pattern 70 below the baffle.

When the adjusting rod 65 is moved to its rearward position as shown in Fig. 5, however, the deflector 13 is tilted to move the baffle 50 rearwardly clear of the falling dust stream 11, so that the dust stream falls undisturbed right through the deflector. Variations in the adjusted position of the deflector between these two extremes varies the width of the dust pattern as required, and the separation of the slides 23 and 24 controls the volume of dust released.

Each leaf spreader C is mounted centrally ahead of and below its associated dust distributor B. It is secured to the lower hopper portion 20 by a mounting arm 73 (Fig. 2). Each leaf spreader C may be of sheet or plate metal and comprises a triangular central bottom portion 74 (Fig. 6) and a pair of rearwardly divergent, upwardly inclined side wing portions 77 and 78. The bottom portion 74 and the two side wings 77 and 78 meet in a point at the forward apex 79 of the bottom portion 74. The wings 77 and 78 are braced against deflection by an interconnecting transverse metal bracing strap 80. Each leaf spreader C is mounted with its triangular bottom portion 74 horizontal and at a height to just clear the crowns of the plants 17 in the hills 82 along which the duster is to be carried by the tractor E.

The hills 82 (Figs. 1 and 3) in which strawberries customarily are planted are precisely formed by well known types of earth working machinery and are planted in accurately spaced rows 83, one row along each side of a hill. Therefore, by spacing the dust distributors B laterally on centers corresponding to the spacing of the plant rows 83, the mechanism may be used for dusting two rows of strawberries simultaneously.

In using the duster of the present invention, it is mounted on the tractor E at a height to position the triangular base portion 74 of the leaf spreader C an inch or two above the top of the hill 82 (Fig. 3) in which the strawberries are planted, and the bottom of the distributor housing 12 is mounted an inch or two above the triangular base portion 74 of the leaf spreader C, and centrally in line therewith. The distributor housing 12 also is mounted so that dust gravitating therethrough will just clear the rear edge 84 of the triangular base portion 74 of the leaf spreader C.

The tractor E is driven along the plant rows 83, with the dust control slides 23 and 24 opened to a desired degree by means of the operating handles 34 to discharge dust streams 11 of desired volume through the discharge openings 10 assisted by the action of the rotor 39.

For dusting large plants the slides 23 and 24 may be opened wide to release a larger amount of powder, and the deflector 13 then may be adjusted forwardly and upwardly to a desired degree, for example, as shown in Fig. 4, to cause the powder to be deflected laterally by sliding down the downwardly diverging and forwardly sloping sides of the inverted, V-shaped baffle 50.

For smaller plants the discharge opening 10 may be opened a smaller amount by moving the slides 23 and 24 apart a shorter distance, and the deflector 13 may be adjusted downwardly and rearwardly as shown in Fig. 5, which allows the discharged powder stream 11 to fall right through the distributor B with little or no deflecting action by the baffle 50. Intermediate adjustment of the deflector 13 may be made as required.

The dust pattern 70 leaving the lower end of the distributor B falls by gravity just rearwardly of the rear edge 84 of the triangular base portion 74 of the leaf spreader C. At this point the leaves **17*a* of the plant 17** (Fig. 6) which have been spread apart by the leaf spreader C are still separated, so that the powder falls directly onto the thus exposed crown of each plant.

After the leaf spreader C has cleared each plant, the leaves **17*a*** thereof slowly swing back to their normal position, leaving the plant in practically its original form, but with its crown thoroughly dusted.

The device is particularly effective for dusting plants against crown-inhabiting types of insects. Also, since some of the powder is spread on the ground around and between the crowns of the plants, it also is effective in controlling other insects. The falling powder is well shielded from any wind that may be blowing by the distributor housing 12, so that the device may be used in almost any weather.

The invention provides effective insect control for low growing leafy plants, and at a substantial saving over some prior art dusters which have attempted to do the work by simply dropping the dust on the undisturbed plants, or by blowing it laterally into the plants.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. An insecticidal duster for movement along a row of low growing leafy plants comprising, in combination, a dust hopper having an axially horizontal cylindrical dust chamber, said chamber having a dust discharge opening in the bottom thereof, means for controlling dust discharge through said opening, a rectangular distributor housing mounted beneath the discharge opening, said housing having a large discharge opening in its lower end, an inverted V-shaped dust deflector mounted centrally within the distributor housing with the apex thereof directed fore-and-aft relative to the direction of movement of the duster along a plant row, means for adjusting the deflector from a position rearwardly clear of a vertical line from the dust discharge opening forwardly to a position intersecting such vertical line, thereby to control the lateral deflection of dust falling by gravity through said opening, and a leaf spreader mounted below the distributor housing and just ahead of said vertical line to spread apart the leaves of plants encountered by the deflector and thus expose the crowns of the plants to the falling dust.

2. An insecticidal duster for movement along a row of low growing leafy plants comprising, in combination, a dust hopper having a dust discharge opening therein, means for discharging a dust stream through said opening, a tubular distributor housing mounted beneath the discharge opening to enclose a stream of dust falling from said opening, an inverted V-shaped dust deflector mounted within the distributor housing with the apex thereof located centrally of a dust stream falling from said opening and directed fore-and-aft relative to the direction of movement of the duster along a plant row, means for adjusting the deflector from a position clear of a dust stream from the opening to a position intercepting such dust stream, thereby to control the lateral deflection of a dust stream falling from said opening, and a triangular leaf spreader mounted below the distributor housing and just ahead such dust stream to spread apart the leaves of plants encountered by the leaf spreader and thus expose the crowns of the plants to the falling dust stream.

3. An insecticidal duster for movement along a row of low growing leafy plants comprising, in combination, a dust hopper, means for discharging a controlled dust stream from said hopper, a dust deflector mounted below said hopper and centrally of a dust stream from said dust discharging means, means for adjusting the deflector from a position clear of a dust stream from the dust discharging means to a position intercepting such dust stream, thereby to control the lateral deflection of such dust stream, and a leaf spreader mounted below the distributor housing and just ahead such dust stream to spread apart the leaves of plants encountered by the leaf spreader and thus expose the crowns of the plants to the dust stream.

4. An insecticidal duster for movement along a row of low growing leafy plants comprising, in combination, a dust hopper, means for discharging a controlled dust stream from said hopper, a tubular distributor housing mounted beneath the dust discharge means to enclose a controlled stream of dust therefrom, and a leaf spreader mounted below the distributor housing and just ahead such dust stream to spread apart the leaves of plants encountered by the leaf spreader and thus expose the crowns of the plants to the dust stream.

5. An insecticidal duster for movement along a row of low growing leafy plants comprising, in combination, a dust hopper, means for discharging a controlled dust stream from said hopper, a tubular distributor housing mounted beneath the dust discharge means to enclose a controlled stream of dust therefrom, and a triangular leaf spreader mounted below the distributor housing and just ahead such dust stream to spread apart the leaves of plants encountered by the leaf spreader and thus expose the crowns of the plants to the dust stream, the leaf spreader comprising a horizontal triangular base portion mounted with one apex thereof pointing forwardly relative to the direction of movement of the spreader along a plant row, and a pair of upwardly and outwardly extending leaf spreading wings, one coextensive with each lateral edge of the triangular base portion, the forward edges of said wings being inclined rearwardly.

6. A crown duster for plants such as strawberry plants comprising a dust hopper adapted to be mounted on a tractor, means for discharging a controlled stream of dust from the hopper for gravitation downwardly therefrom, an upright tubular distributor housing mounted for passage of the gravitating dust stream downwardly therethrough, a dust deflector pivotally connected to the dust distributor for tilting movement about an axis disposed transversely of the direction of tractor movement, said dust deflector comprising a tubular housing, control means connected to the deflector for tiltably adjusting it from a first position with its tubular housing axis substantially coincident with that of the distributor housing in which it is mounted to a second postion at a substantial angle of inclination relative thereto, an inverted V-shaped baffle mounted transversely of the deflector housing and sealed to the side and rear walls thereof, the forward edge of the baffle being spaced rearwardly from the forward edge of the deflector housing, the baffle being positioned for movement upon tilting adjustment of the tubular deflector housing from a position intercepting the dust stream when the deflector housing is in said first position to a position substantially clear of the falling dust stream when the deflector is in a said second position, and a leaf spreader mounted centrally ahead of and below the distributor housing at a height to engage and spread apart the leaves of plants encountered thereby, thereby exposing the crowns of the plants to the gravitating dust.

7. A crown duster for plants such as strawberry plants comprising a dust hopper adapted to be mounted on a tractor, means for discharging a controlled stream of dust from the hopper for gravitation downwardly therefrom, a distributor housing mounted for passage of the gravitating dust stream downwardly therethrough, a dust deflector pivotally connected to the dust distributor for tilting movement about an axis disposed transversely of the direction of tractor movement, control means connected to the deflector for tiltably adjusting it from a position intercepting the dust stream to a position substantially clear of the dust stream, and a leaf spreader mounted centrally ahead of and below the distributor housing at a height to engage and spread apart the leaves of plants encountered thereby, thereby exposing the crowns of the plants to the gravitating dust.

References Cited in the file of this patent

UNITED STATES PATENTS

| Re. 7,191 | Gorham | June 27, 1876 |
|---|---|---|
| 11,611 | King | Aug. 29, 1854 |
| 394,369 | Johnston | Dec. 11, 1888 |
| 1,495,098 | Nelson | May 20, 1924 |